(12) United States Patent
Donskoy et al.

(10) Patent No.: US 8,085,622 B2
(45) Date of Patent: Dec. 27, 2011

(54) ULTRA LOW FREQUENCY ACOUSTIC VECTOR SENSOR

(75) Inventors: Dimitri Donskoy, Fair Haven, NJ (US); Nikolay Sedunov, Hoboken, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 338 days.

(21) Appl. No.: 12/414,819

(22) Filed: Mar. 31, 2009

(65) Prior Publication Data

US 2009/0245028 A1    Oct. 1, 2009

Related U.S. Application Data

(60) Provisional application No. 61/072,481, filed on Mar. 31, 2008.

(51) Int. Cl.
*G01V 1/16* (2006.01)
*G01F 1/66* (2006.01)

(52) U.S. Cl. ............... 367/178; 367/140; 73/861.21
(58) Field of Classification Search .......... 367/140, 367/178, 179; 73/861.21
See application file for complete search history.

(56) References Cited

U.S. PATENT DOCUMENTS

| 6,038,924 A * | 3/2000 | Lee et al. ............ 73/514.34 |
| 6,697,302 B1 * | 2/2004 | Cray et al. ............ 367/141 |
| 6,859,420 B1 * | 2/2005 | Coney et al. ............ 367/178 |
| 7,536,913 B2 * | 5/2009 | Naluai et al. ............ 73/633 |
| 7,926,614 B2 * | 4/2011 | Tenghamn et al. ........... 181/121 |

OTHER PUBLICATIONS

Gabrielson, Thomas B. et al, "A simple neutrally buoyant sensor for direct measurement of particle velocity and intensity in water", J. Acoust. Soc. Am., vol. 97 No. 4, (1995), pp. 2227-2237.
Berliner, Marilyn J. et al, Acoustic Particle Velocity Sensors: Design, Performance, and Applications, J. Acoust. Soc. Am., vol. 100, No. 6, (1966), pp. 3478-3479.

* cited by examiner

*Primary Examiner* — Ian Lobo
(74) *Attorney, Agent, or Firm* — Greenberg Traurig, LLP

(57) ABSTRACT

An acoustic vector sensor mounted in a housing is provided for measuring ultra low frequency acoustic wave particle velocities in a liquid, comprising a horn for amplifying the acoustic wave particle velocities, and a neutrally buoyant object supported in a liquid contained in the horn. The neutrally buoyant object, in reacting to the amplified acoustic wave particle velocities, produces displacements that are sensitively measured.

13 Claims, 4 Drawing Sheets

ULTRA LOW FREQUENCY ACOUSTIC VECTOR SENSOR

CROSS-REFERENCE TO RELATED APPLICATIONS

The present application is a Section 111(a) application relating to commonly owned, co-pending U.S. Provisional Patent Application Ser. No. 61/072,481, filed Mar. 31, 2008, the disclosure of which is incorporated herein by reference in its entirety.

FIELD OF THE INVENTION

The present invention relates to underwater acoustic measurement devices, and, more particularly, to underwater acoustic measurement devices related to seismic exploration, underwater surveillance (detection of divers, submarines, torpedoes, etc.), tsunami and seismic activity monitoring, and other similar activities.

BACKGROUND OF THE INVENTION

Traditional underwater acoustic sensors are pressure sensors (e.g., hydrophones) responsive to oscillating pressure in the field of the acoustic wave. Pressure is a scalar quantity, so a single hydrophone (smaller than the acoustic wavelength) has no directionality. Unlike hydrophones, vector sensors are responsive to water oscillatory velocity (or pressure gradients) associated with the same acoustic wave. Because velocity is a vector, the vector sensor has directionality even if its size is much smaller compared to the acoustic wavelength. This may not be a big advantage at relatively high acoustic frequencies (tens of kHz), but it has an unsurpassed advantage at low frequencies (tens-thousands of Hz) and, especially, at ultra low frequencies in the range of a fraction of a Hz to tens of Hz.

To measure particle velocity in the water, conventional vector sensors (or particle velocity sensors) are designed to be neutrally buoyant in the water column. Developing a highly sensitive, low-noise vector sensor in a small, neutrally buoyant package is extremely challenging. It becomes even more challenging for the ultra low frequency range. One reason accelerometers used in conventional sensors are not suitable for sensitive measurements at ultra low frequencies is that acceleration is proportional to f*v, where v is the particle velocity and f is the frequency. As the frequency decreases, the accelerometer's sensitivity decreases accordingly. It will be more advantageous to measure displacement, x, rather than acceleration, as the displacement is proportional to v/f. That is, for the given particle velocity, the displacement is increased as the frequency goes down.

Another challenging problem is the suspension of the sensor in a water column. The conventional sensor is configured as a neutrally buoyant body containing an inertial measuring element such as an accelerometer. Yet the sensor should be fixed at a particular location in the water column using some sort of suspension element. However, the suspension element restricts the free motion of the neutrally buoyant body which interferes with measurements. The neutrally buoyant body is also directly exposed to water currents which force the body to float away from its designated location, while the suspension element restricts this forced motion. All of these factors causes additional noise and interference with the sensor operation, especially at low frequencies.

SUMMARY OF THE INVENTION

The problems and disadvantages associated with the prior art are overcome by the present invention, which includes an ultra low frequency acoustic vector sensor for measuring acoustic wave particle velocities in a liquid, such as water. The acoustic vector sensor includes a housing, a horn positioned within the housing for amplifying the acoustic wave particle velocities, and a buoyant object positioned within the horn. The buoyant object is moveable between a stationary position and a displaced position in response to the amplified acoustic wave particle velocities. A sensor senses the displacement of said buoyant object. The buoyant object, which can consist of any desired shape and size (e.g., spherical, cylindrical, etc.) may be mounted to horn either mechanically or magnetically, and is neutrally or near-neutrally buoyant.

Further features and advantages of the invention will appear more clearly on a reading of the detailed description of the exemplary embodiments of the invention, which are given below by way of example only with reference to the accompanying drawings.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE INVENTION

Figure 1:
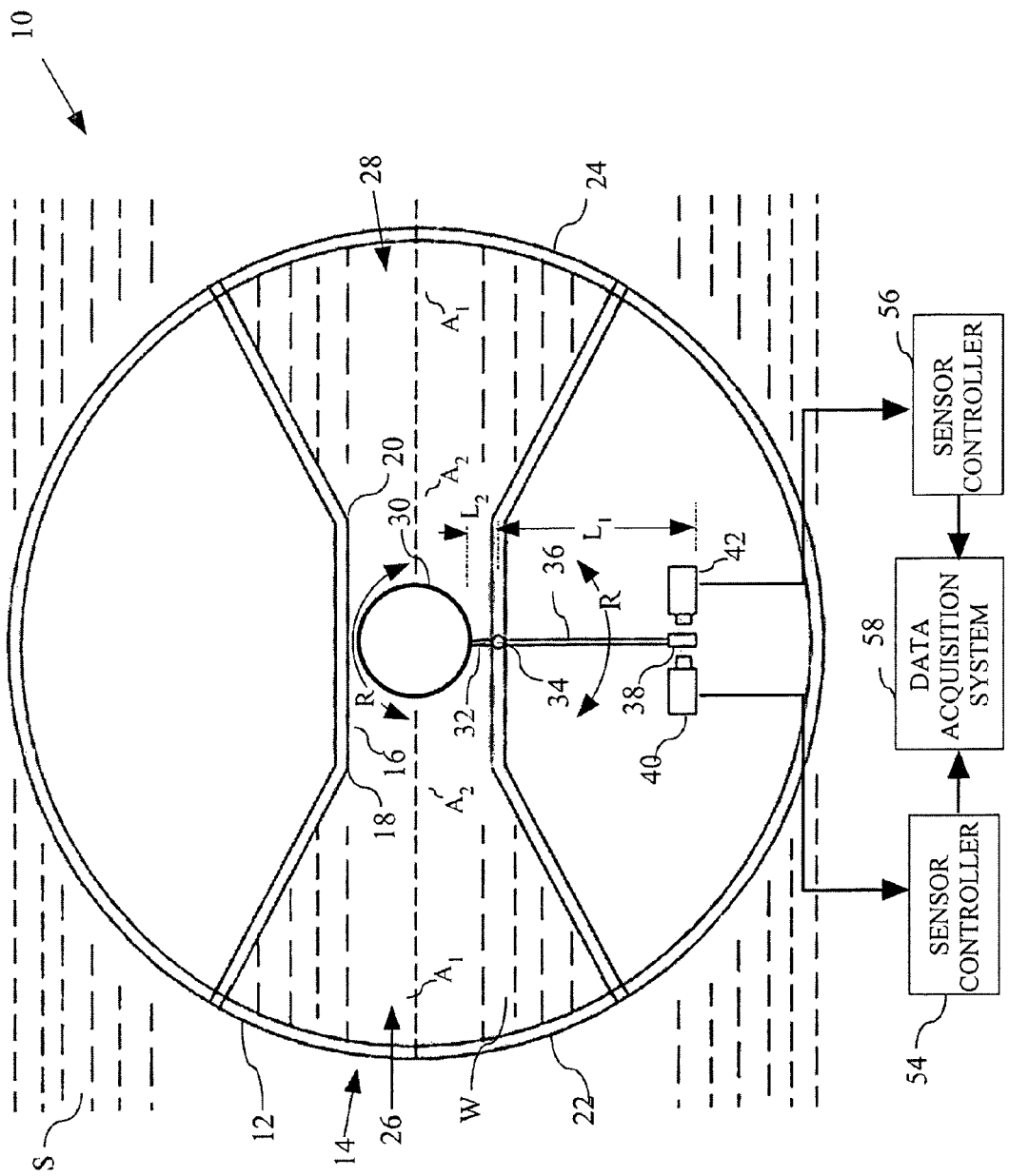
FIG. 1 is a schematic diagram of an ultra low frequency vector sensor having a neutrally buoyant sphere suspended in a horn, according to a first embodiment of the present invention.

FIG. 1 illustrates an ultra low frequency acoustic vector sensor (herein "the acoustic sensor") 10 constructed in accordance with an exemplary embodiment of the present invention. The acoustic sensor 10 is adapted to measure ultra low frequency liquid particle oscillations when positioned in a body of water S (e.g., a sea or lake). More particularly, the acoustic sensor 10 includes a spherically-shaped housing 12 which has a liquid-tight compartment or horn 14 positioned centrally therein. The horn 14 is shaped in the form of an axis-symmetrical body of revolution having its longitudinal axis coincident with a diameter of the housing 12. A tube 16 having openings 18, 20 is centrally positioned in the horn 14. Sound transparent membranes or screens 22, 24 are located at opposite ends of the horn 14 for allowing acoustic wave oscillations (not shown) to enter and leave the horn 14, while preventing water S from entering the horn 14.

A frustoconically shaped section 26 of the horn 14 is located between the screen 22 and the opening 18 of the tube 16, and is tapered with its largest cross-sectional area $A_1$ located at the screen 22 and its smallest cross-sectional area $A_2$ located at the opening 18 of the tube 16. An identically shaped section 28 of the horn 14 is located between the screen 24 and the opening 20 of the tube 16 and is tapered with its largest cross-sectional area $A_1$ located at the screen 24 and its smallest cross-sectional area $A_2$ located at the opening 20 of the tube 16. The interior of the horn 14 is filled with water W or other liquid that has similar acoustic impedance as water.

A small neutrally buoyant object in the form of a sphere (herein "the sphere") 30 is supported in the tube 16 of the horn 14 by a rod 32. The rod 32 is rigidly attached to a pivot 34 that is positioned in a liquid-tight manner centrally in the circumference of the tube 16. Another rod 36 is rigidly attached to the pivot 34 and extends outside the horn 14. The axis of the rod 32 is coincident with the axis of the rod 36 (i.e., the rods 32, 36 are oriented in a straight-line). The pivot 34 permits the rods 32, 36 to freely rotate in the directions indicated by the arrow R. A pad 38 attached to the end of the rod 36 is positioned between conventional displacement sensors 40, 42, to facilitate measurement of the oscillations of the pad 38. The length of the rod 36 is denoted as L1 and extends from the end of the pad 38 to the center of the pivot 34 and the length of the rod 32 is denoted as L2 and extends from the circumference of the sphere 30 to the center of the pivot 34.

Figure 4:
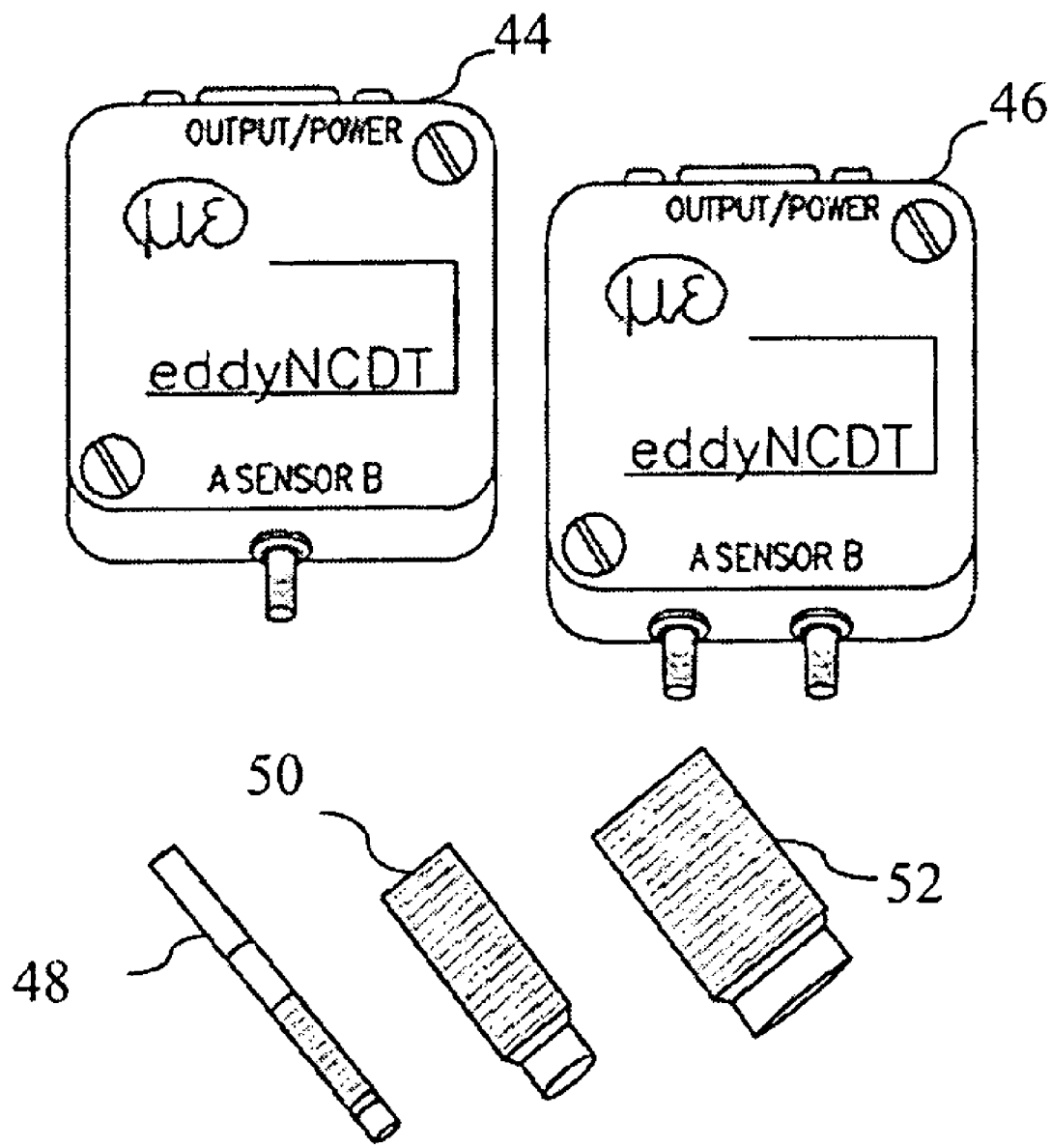
FIG. 4. is a perspective view of conventional eddy current sensing apparatus that may be utilized for measuring movements of the sphere shown in FIG. 1 and the cylinder shown in FIG. 3.

The direction of the oscillations of the acoustic wave particles is substantially parallel with the longitudinal axis of the horn 14. As the sphere 30 oscillates in the field of the acoustic wave, the pivoted arrangement of the rods 32, 34 mechanically amplifies the displacements of the sphere 30. The amplification factor $K_P$ is equal to the ratio of the lengths $L_1$ and $L_2$ of the rods 32, 36, respectively. More particularly, $K_P=L_1/L_2$. The amplified displacement of the pad 38 at the end of rod 36 is measured with displacement sensors 40, 42. Alternately, FIG. 4 depicts examples eddy current sensing elements (e.g., manufactured by Micro-Epsilon, Model Number EddyNCDT 3700) that may be used in place of the displacement sensors 40, 42. Eddy current sensors and other motion sensing alternatives are discussed hereinafter. Signals generated by the displacement sensors 40, 42 are routed to sensor controllers 54, 56 and to a data acquisition system 58 for signaling processing.

Figure 2:
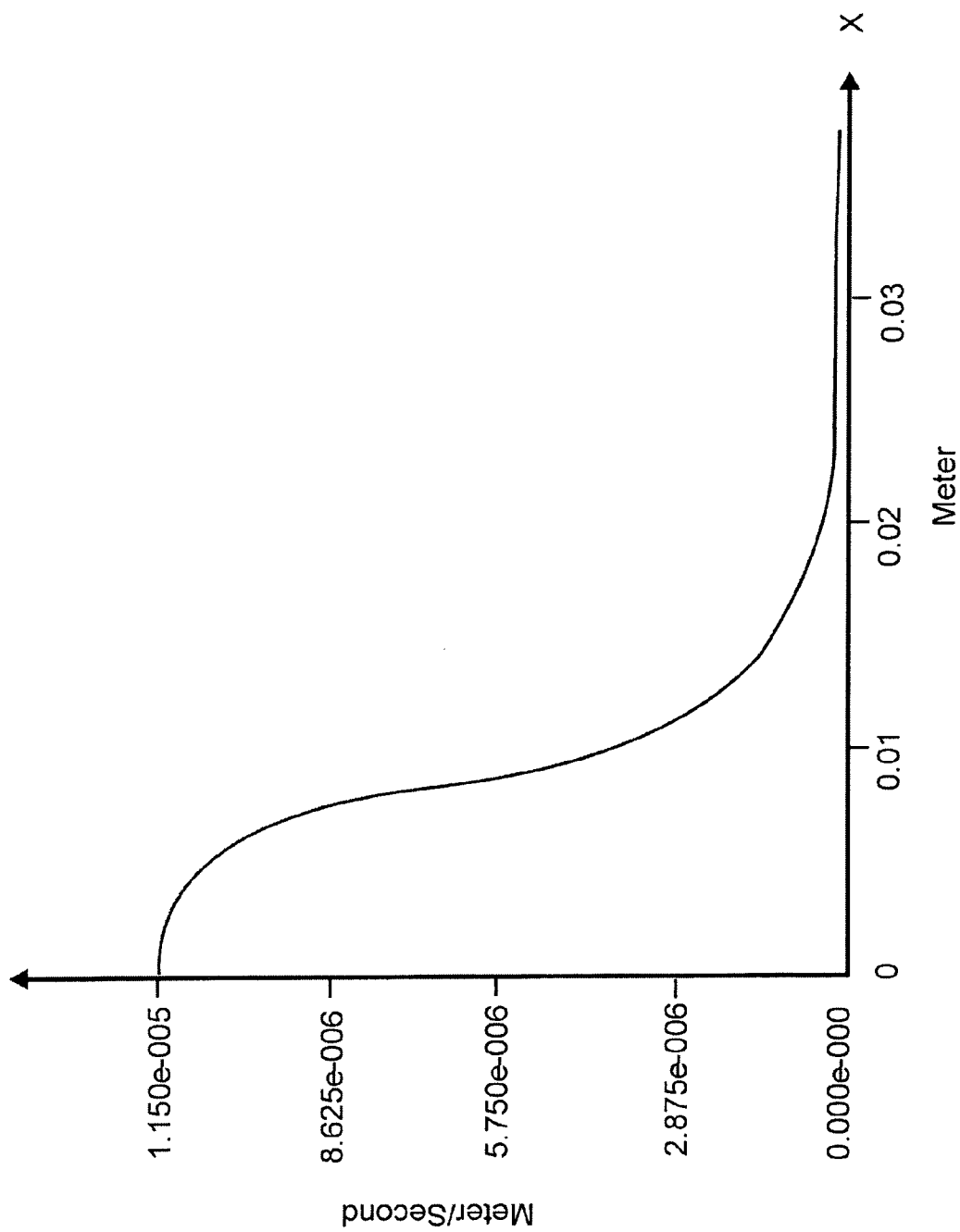
FIG. 2. is a graphical plot of acoustic wave particle velocity versus position along the longitudinal axis of the horn of the vector sensor shown in FIG. 1.

FIG. 2 depicts a graph of acoustic wave particle velocity (i.e., digitally simulated) in the horn 14 (i.e., plotted on the Y-scale) versus positions along the longitudinal axis of the horn 14 (i.e., plotted on the X scale). The 0 position on the X scale denotes the center of tube 16 of the horn 14 in which vicinity the particle velocities are at the highest amplitudes. As the acoustic wave enters and progresses through the horn 14, the wave particle velocity increases in the vicinity of the sphere 30 by a factor of $K_H=A_1/A_2$.

Referring again to FIG. 1, the combination of the amplification of the particle velocities (i.e., amplified by sections 26, 28 of horn 14) and the mechanical amplification of the displacements of the sphere 30 (i.e., amplified by the pivotal arrangement of the rods 32, 36) yields a total measured amplification of the particle velocity of the wave as follows:

$$v_{measured}=K_P*K_H*v_{wave},$$

where $v_{measured}$ is the particle velocity measured by the sensors 40, 42 and $v_{wave}$ is the particle velocity in the incident acoustic wave.

Velocity sensitivity ($S_V$) of the acoustic sensor 10 can be estimated using the following formula:

$$S_V=2\pi f*S_D/(K_H*K_P),$$

where f is the frequency and $S_D$ is the sensitivity of the displacement sensor. For example, for amplifications $K_H=100$ and $K_P=10$; $S_D=0.4$ nm, f=1 Hz, the sensitivity of the acoustic sensor 10 will be $S_V=0.0025$ nm/s.

Figure 3:
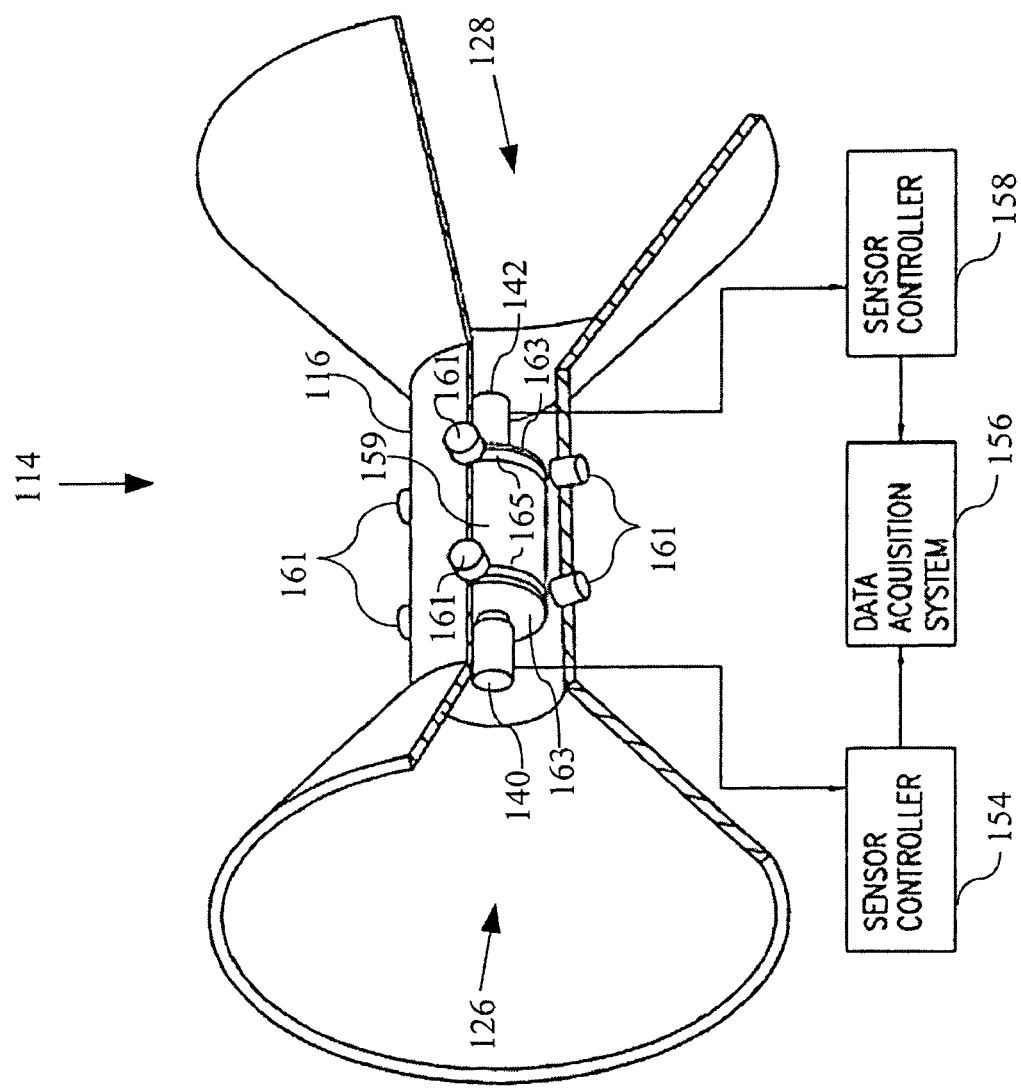
FIG. 3. is a perspective breakaway view of an ultra low frequency vector sensor with a neutrally buoyant cylinder magnetically suspended in a horn, according to a second embodiment of the present invention.

Referring to FIG. 3, another exemplary embodiment of the present invention is illustrated. The elements illustrated in FIG. 3 which correspond to the elements described above with reference to FIG. 1 have been designated by corresponding reference numerals increased by one hundred, while new elements are designated by odd reference numerals in the one hundreds. The embodiment of the present invention shown in FIG. 3 operates and is constructed in a manner consistent with the embodiment shown in FIG. 1, unless otherwise indicated. FIG. 3 illustrates a horn 114 which has frustoconically shaped sections 126, 128 connected to a centrally positioned tube 116. A neutrally buoyant object in the form of a cylinder (herein "the cylinder") 159 is magnetically suspended in the tube 116 by a plurality of permanent magnets 161. An aluminum disc 163 and a bismuth disc 165 are positioned at opposite ends of the cylinder 159 to facilitate the magnetic suspension of the cylinder 159 in the horn 114, although other magnet-responsive metal elements may be utilized for this purpose. Movements of the cylinder 159 are measured by displacement sensors 140, 142, and signals emanating from the sensors 140, 142 are routed to sensor controllers 154, 156 and to a data acquisition system 158 for signaling processing. It is noted that this embodiment of the present invention differs from the embodiment described hereinabove, in that a) no mechanical amplification of the displacement of the cylinder 159 is provided, and b) the displacement sensors 140, 142 are positioned inside the horn 114.

Unlike conventional vector sensors, the present invention provides a number of features leading to unsurpassed sensitivity and utility at the ultra low and the low frequency ranges spanning from a fraction of Hz to thousands of Hz. The placement of the sphere 30 inside the horn 14 facilitates measurements of the motion of a neutrally buoyant object, and this factor in conjunction with the combined total amplification enables a very high sensitivity of the acoustic sensor 10 at ultra low and low frequency ranges. The sphere 30 of the horn 14 is supported within the housing 12 such that it reacts to the forces exerted on it by the particle velocities of the acoustic wave oscillations without being disturbed by current flows or other disturbances that occur outside the horn 14 of the acoustic sensor 10 (i.e., no exposure to interfering currents and environmental degradation, such as bio-fouling, mineral deposits, etc). As stated above, the direct measurement of the displacements of the pad 38 is advantageous as compared with the inertia-based measurement approach utilized in conventional sensors.

It will be understood that the embodiment described herein is merely exemplary and that a person skilled in the art may make many variations and modifications without departing from the spirit and scope of the invention. For instance, the frustoconically shaped sections 26, 28 of the horn 14 may be in form of any appropriate shape that amplifies the acoustic wave particle velocity oscillations. Different suspension arrangements of the neutral or near-neutral buoyancy object could be implemented, for example, mechanical suspension using strings, etc. Multiple (e.g., differential) motion sensors could be used for displacement measurements of the sphere 30. The housing 12 may be shaped in any form and fabricated from any material that is appropriate for immersion in sea water for extended periods of time. Likewise, since the sphere 30 of the horn 14 does not contain any internal elements, it may be formed in any size or shape that is appropriate (e.g., symmetrical) to minimize any distorting effect of the incident acoustic wave field impinging thereon. There are a number of displacement or velocity sensing techniques (including optical/laser based, electro-magnetic, and others) that could be utilized to measure the motion of the sphere 30. For example, eddy current displacement sensors, such as those shown in FIG. 4, could be used. These sensors, used for precision displacement measurements in semiconductor manufacturing, optical telescopy and microscopy, and many other applications requiring precision displacement control, offer extremely high resolution of 0.4 nm in the frequency range from 0 to 1 kHz and approximately 1 nm in the range above 1 kHz to 10 kHz. All such variations and modifications, including those discussed above, are intended to be included within the scope of the invention as defined in the appended claims.

We claim:

1. A sensor for measuring acoustic wave particle velocities in a liquid, comprising:
    a housing;
    a horn positioned within said housing for amplifying the acoustic wave particle velocities;
    a buoyant object positioned within said horn, said buoyant object being moveable between a stationary position and a displaced position in response to the amplified acoustic wave particle velocities; and
    sensing means, mounted within said housing, for sensing the displacement of said buoyant object.

2. The sensor of claim 1, wherein said buoyant object is neutrally buoyant.

3. The sensor of claim 1, wherein said buoyant object is near-neutrally buoyant.

4. The sensor of claim 2, wherein said buoyant object is suspended within a liquid.

5. The sensor of claim 1, wherein said buoyant object is spherical in shape.

6. The sensor of claim 1, wherein said buoyant object is cylindrical in shape.

7. The sensor of claim 5, wherein said buoyant object is mounted pivotally to said horn.

8. The sensor of claim 6, wherein said buoyant object is mounted magnetically to said horn.

9. The sensor of claim 1, wherein the acoustic wave particle velocities are characterized by an ultra low frequency.

10. A sensor for measuring low frequency acoustic wave particle velocities in a fluid media, comprising reacting means for reacting to acoustic wave particle velocities in a reaction direction within a fluid passageway, and measuring means, located in close proximity to said reacting means, to measure displacement of said reacting means, wherein said fluid passageway has a profile, having a horn shape, to amplify the acoustic wave particle velocities in said reaction direction.

11. The sensor of claim 10, further comprising a housing, wherein said reacting means is located inside said housing, wherein said housing allows for a reaction to the acoustic wave particle velocities in said reaction direction.

12. The sensor of claim 11, wherein said housing includes said fluid passageway extending in said reaction direction allowing unobstructed acoustic wave particle oscillation in said reaction direction.

13. The sensor of claim 10, wherein said reacting means includes an object having a volume and contained within the surrounding fluid media, said object being adapted to react to the acoustic wave particle velocities which produce a displacement of said object.

* * * * *